United States Patent [19]
Giesfeldt et al.

[11] Patent Number: 5,972,091
[45] Date of Patent: Oct. 26, 1999

[54] STARCH REPLACEMENT COMPOSITION FOR CORRUGATING ADHESIVES AND THE ADHESIVES PREPARED THEREWITH

[75] Inventors: J.E. Todd Giesfeldt, LaGrange; Jack R. Wallace, Bolingbrook; Tammi Brandt-Janel, New Lenox; Roman Skuratowicz, Hickory Hills, all of Ill.

[73] Assignee: Corn Products International, Inc., Bedford Park, Ill.

[21] Appl. No.: 09/010,463

[22] Filed: Jan. 21, 1998

[51] Int. Cl.6 .............................. C09J 103/02; B32B 3/28; B05D 1/26

[52] U.S. Cl. ........................ 106/126.1; 428/182; 156/205; 156/336

[58] Field of Search ........................ 106/126.1; 428/182; 156/205, 336

[56] References Cited

U.S. PATENT DOCUMENTS

| | | | |
|---|---|---|---|
| 4,517,022 | 3/1985 | Harvey | 127/68 |
| 4,941,922 | 7/1990 | Snyder | 106/214 |
| 5,358,559 | 10/1994 | Fitt et al. | 106/213 |
| 5,503,668 | 4/1996 | Giesfeldt et al. | 106/162 |
| 5,777,005 | 7/1998 | Giesfeldt et al. | 524/53 |
| 5,855,659 | 5/1999 | Giesfeldt et al. | 106/163.01 |

*Primary Examiner*—David Brunsman
*Attorney, Agent, or Firm*—Norris, McLaughlin & Marcus

[57] ABSTRACT

A dry blend pre-mixture composition for use in making corrugating adhesives is comprised of starch and from about 5% to about 20% of ground plant germ. The starch and germ can be derived from various plant sources and in a preferred embodiment the starch is corn starch and the germ is ground corn germ, also known as spent flake. The corrugating adhesives can be prepared by using the pre-mixture as a replacement for starch in a process for making a carrier, no-carrier or carrier-no-carrier adhesive.

11 Claims, No Drawings

STARCH REPLACEMENT COMPOSITION FOR CORRUGATING ADHESIVES AND THE ADHESIVES PREPARED THEREWITH

BACKGROUND OF THE INVENTION

1. Field of the Invention

The present invention relates to a starch replacement composition which is used to prepare starch-based corrugating adhesive compositions and the adhesive compositions prepared therewith. In particular, the invention has to do with a dry blend pre-mixture composition comprising starch and ground plant germ. The pre-mixture is employed as a complete or partial replacement for starch in a carrier, no-carrier or carrier-no-carrier corrugating adhesive.

2. The Related Art

In the corrugating process, adhesive is commonly applied to the tips of the flutes of a corrugated medium. Then a noncorrugated flat paper liner is applied against the adhesive coated flutes as they pass between a corrugating roll and a pressure roll. The resulting product has the corrugating medium on one side and a flat liner on the other side and is called a single-face portion. The single-face portion may be used "as is" (called a "single face" board) or adhesive may be applied to the flute tips of the single-face portion and a second flat sheet can be applied in the same manner as the first in what is called a "double-face" or a "double-back" operation. The second liner sheet is treated with heat and reduced pressure (relative to the pressure used to make a single-face portion) immediately following contact with the adhesive.

Starch-based adhesives which can be of the carrier, no-carrier and carrier-no-carrier type are commonly used in processes for manufacturing corrugated paper board. In carrier type adhesives, a portion of the starch (or dextrin) forms a carrier, often known as the gelatinized phase, which suspends the balance of the starch which is in an ungelatinized state. Under conditions of heat and pressure, the ungelatinized starch is rapidly hydrated and gelatinized to increase quickly the viscosity and adhesivity of the adhesive composition. In no-carrier type adhesives, all of the starch is slightly cooked or swollen with heat and caustic soda for viscosity. Finally, carrier-no-carrier type adhesives have a portion of the starch which forms a carrier and is responsible for about one half of the viscosity and the remaining viscosity is obtained by slightly swelling the uncooked starch.

Corrugating adhesives having a solubilized cellulosic fiber component are described by Fitt in U.S. Pat. No. 5,358,559 and by Giesfeldt et al. in U.S. Pat. No. 5,503,668. These adhesives are prepared employing in situ solubilization processes which are carried out in the primary mixer when preparing a two-part Stein-Hall carrier paste. This is contrasted with the present invention wherein ground plant germ is added to the primary and secondary mixers and wherein the processing conditions in the secondary mixer are not designed to cause in situ solubilization.

According to U.S. Pat. No. 4,941,922, long thin fibers can be added to starch-based corrugating adhesives to enhance adhesion based on a mechanism of fiber-to-fiber entanglements. These entangling fibers are said to enhance dispersion and yield improved adhesive characteristics including increased waterproofness, dry strength, viscosity and adhesiveness. Suitable sources of fiber are described as cellulosic fiber including wood, paper, cotton and rayon; fibers of synthetic origin including Nylon, polyester, polypropylene, Lycra Spandex, Vyrene, Vinyon, Dynel, Saran, Creslan, Acrylic, polyethylene, Teflon, tetrafluoroethylene, glass, Corlon and metallic fibers. Fibers generated during the wheat or corn milling processes are also said to be suitable. According to the patent, the fibers typically are suspended initially in the uncooked starch portion, suspended with the carrier portion, suspended prior to the carrier-no-carrier (or no-carrier) swell or added to the final adhesive mixture prior to storage or use. There is no experimental data in the patent, however, describing the use of fibers generated during the corn or wheat milling processes. Furthermore, the fibers must be present in an amount from about 2.2 to about 22 pounds of fiber per 100 pounds of corrugating adhesive and must have a diameter of between about 0.0005 inches and about 0.02 inches and a length of between about 0.025 inches and about 0.25 inches to cause fiber-to-fiber entanglements. In contrast, the ground plant germ of the present invention is not long and thin, the shape more closely approximates spheres or cubes, and the germ is believed to enhance adhesive properties because it is sticky.

The present invention also has the surprising advantage that a commercially viable adhesive paste can be made with no boron compound or a substantially reduced amount of boron compound.

In the present specification and claims, all parts and percentages are by weight/weight (w/w) unless otherwise specified, and the term "parts of adhesive" is used to refer to the total weight of adhesive, including water, starch, plant germ and all chemicals. The term "parts of carrier phase" is used to refer to the total weight of the carrier phase, including water, starch, plant germ and all chemicals. The term "total solids" is used to refer to the total dry basis ("d.b.") weight of the ingredients of the adhesive or the carrier phase or suspended phase thereof, including starch and plant germ but not including chemicals such as caustic, borax and the like.

SUMMARY OF THE INVENTION

A dry blend pre-mixture composition of starch and ground plant germ has been discovered which can be used as a complete or partial replacement for the starch component of a corrugating adhesive. The pre-mixture comprises starch and from about 5% to about 20% and preferably from about 5% to about 15% commercial basis ("c.b.") of ground plant germ. The starch and germ can be derived from various plant sources and in a preferred embodiment the starch is corn starch and the germ is ground corn germ, also known as spent flake. On a commercial basis starch generally has a moisture content from about 8%–15%, usually about 11%–13%, and spent flake generally has a moisture content of from about 4–5%.

A corrugating paste of the invention can be prepared by using the pre-mixture as a replacement for starch on a one to one wt./wt. basis in a process for making a carrier, no-carrier or carrier-no-carrier adhesive. When making a carrier adhesive, for example, the pre-mixture is employed as a complete, or at least partial, replacement for starch in the secondary mixer and, optionally, as a complete or partial replacement for starch in the primary mixer.

In an alternative embodiment of the invention, ground plant germ can be admixed as an ingredient with the other adhesive components at the corrugating plant and the amount of starch employed would be reduced by the amount of germ added. Accordingly, the amount of germ in the adhesive would be from about 5% to about 20% and preferably from about 5% to about 15% based on the weight of starch c.b.

The corrugating paste of the invention can be made with no boron compound, or with a significantly reduced amount of boron compound, and a large amount of insoluble material is allowed to exist in the finished paste.

DETAILED DESCRIPTION OF THE INVENTION

The dry blend pre-mixture composition of the invention is used as a replacement for the starch in starch based corrugating adhesives. The pre-mixture comprises, consists essentially of or consists of a dry blend of starch and from about 5% to about 20%, preferably from about 5% to about 15% ground plant germ. The moisture content of the pre-mixture is from about 8% to about 12%.

The corrugating adhesive prepared using the pre-mixture composition of the invention is an aqueous emulsion which comprises water; from about 80% to about 100% by weight based on total solids of the pre-mixture composition; and from about 20 to about 0% by weight based on total solids of an additional starch component, and sufficient caustic to attain a pH from about 10 to about 14, preferably from about 12 to about 14. The starch component preferably is unmodified starch, but modified starch or dextrin would also work.

In the carrier adhesive embodiment, the carrier phase comprises from about 8 to about 16 parts of a starch component and/or the pre-mixture composition of the invention per 100 parts of adhesive. The starch component can be comprised of unmodified starch, modified starch and/or dextrin. A preferred starch is 3005 pearl starch available from Corn Products International, Bedford Park, Ill., U.S.A. Accordingly, the starch component and/or pre-mixture composition of the carrier phase can comprise from about 100%–0% unmodified starch; from about 0%–100% modified starch; from about 0%–100% dextrin; and from about 0% to about 100% of the pre-mixture composition. When the adhesive is a carrier-no-carrier adhesive, from about 0.05 to about 0.10 parts of the starch component and/or pre-mixture composition is in a carrier phase and the remainder is partially swollen to attain a viscosity from about 30 to about 50 seconds, preferably from about 35 to about 45 seconds, as determined by an orifice type viscometer commonly known as a Stein-Hall cup.

The adhesive of the invention can contain from about 0 to about 0.5 parts per 100 parts of adhesive of a boron containing compound. This compares with from about 0.02 to 1 parts per 100 parts of adhesive in typical prior art formulations. A waterproofing or water resistant resin also can be incorporated in the adhesive in an amount from about 0.5 to about 5 parts per 100 parts of adhesive.

In a preferred embodiment, the adhesive is a carrier type or carrier-no-carrier type adhesive, the starch is pearl starch from the corn wet milling process and the plant germ is ground spent flake from the corn wet milling process. The germ is ground to a particle size from about 20 to about 200 microns using conventional grinding means. For example, a D6 Fitz Mill (available from Fitzpatric Company, 830 Industrial Drive, Elmhurst, Ill., U.S.A.) can be used to grind the germ so that about 62% is retained on a 200 mesh screen and about 73% is retained on a 325 mesh screen.

Carrier Type Adhesive Preparation

The carrier type corrugating adhesive composition of the invention is made by separately preparing two intermediates and then combining them. One intermediate is called the carrier phase and the other is called the suspended phase.

The carrier phase can be made by admixing in a primary mixer from about 85–120 lbs. of the starch component and/or pre-mixture composition with about 100 gallons of water (or from about 9–13 parts, preferably about 10–11 parts of the starch component and/or pre-mixture per 100 parts water) and continuously mixing for from about 10 minutes to about 40 minutes, preferably from about 15–35 minutes, while heating to a temperature from about 130–160° F. (54.4–71.1° C.) and preferably from about 140–145° F. (60–62.8° C.). Sufficient caustic (NaOH at a concentration of 50% w/w) is then added in an amount from about 25–35 parts, preferably from about 29–33 parts, per 100 parts of the carrier phase to provide an alkaline pH while continuing mixing and maintaining heating. The pH should be from about 10–14 and preferably should be from about 12–14.

Following the removal of heat, mixing can be continued to allow uniform cooling or cool water in an amount from about 6–12 parts, preferably about 8–10 parts, of total adhesive water (or about 48–60 gallons) can be added at this stage to speed cooling.

The suspended phase is made by admixing in a secondary mixer from about 22–28 parts (from about 1000–1500 lbs.), preferably from about 24–26 parts, of the pre-mixture per 100 parts of heated secondary mixer water (about 450 gallons of water). The water temperature is from about 70° F. (21° C.) to about 105° F. (41° C.), preferably about 85–95° F. (29.4–35° C.), and is mixed continuously.

In conventional starch based corrugating adhesives, a boron containing compound such as boric acid or a boric acid salt must be added at some stage in the process to improve tack or stickiness. When the pre-mixture of the present invention is employed, however, little or no boron containing compound is needed. A boron compound, however, may be employed optionally in reduced amounts compared with those required according to the prior art. The boron compound usually comprises 5M boric acid or 10M borax and can be employed in an amount from about 0 to 6, preferably about 2–5 parts, per 100 parts of total adhesive weight. It may be added in the preparation of the carrier phase, the suspended phase, or in both phases. When a portion of the boron containing compound is added during the preparation of the carrier phase, it also improves the viscosity stability of the final adhesive product. Preferably, however, most of the boron containing compound is added to the suspended phase.

The carrier phase is gradually added to a tank containing the suspended phase with continuous mixing of the contents of the tank. The temperature of the tank contents is maintained at from about 70° F. (21° C.) to about 105° F. (41° C.), preferably about 85–95° F. (29.4–35° C.), during the gradual addition. The amount of the carrier phase added is from about 15 to about 50 parts per 100 parts of adhesive.

A waterproofing or water resistant resin may be added to the suspended phase tank at any time in an amount from about 0.5 to about 5 parts per 100 parts of adhesive. It is preferable to add the resin following completion of all of the other adhesive preparation steps.

No-Carrier-Type Adhesive Preparation

The no-carrier type adhesive composition of the invention is prepared by controlled swelling of the entire pre-mixture portion, which also can include added starch, to obtain desired finished adhesive viscosity.

In the no-carrier type preparation, all of the pre-mixture portion is mixed with water at a temperature from about 90–100° F. (32.2–37.8° C.), preferably 95° F. (35° C.), to make a slurry. The pre-mixture portion can be added in an amount from about 19–28 parts, preferably about 23–25 parts, pre-mixture per 100 parts of total adhesive. In a typical 600 gallon batch, about 900–1300 lbs. of pre-mixture is added to about 400 gallons of water. After the pre-mixture and water slurry is sufficiently mixed, a hot caustic solution, consisting of about 2–5 parts, preferably about 3–4 parts, dry caustic (crystalline NaOH) in about 100 parts of 130° F. (54.4° C.) water, is metered into the slurry, in an amount from about 15–22 parts, preferably about 16–18 parts, hot caustic per 100 parts of total adhesive, at a predetermined controlled rate of approximately 90–130 liters/min., preferably from about 100–110 liters/min. When the caustic solution has been added, the pre-mixture portion will continue to swell until a desired viscosity is reached and the pH is between about 10–14, preferably about 12–14. When a desired viscosity is reached, boric acid in the amount of about 50–85 parts, preferably about 55–70 parts, boric acid to 100 parts dry caustic, is added to stop the reaction thus stopping the swelling.

Carrier-No-Carrier Type Adhesive Preparation

The carrier-no carrier type adhesive composition of the invention is prepared by utilizing the carrier type method but the use of the boron containing compound is delayed until the primary portion has been dropped into the suspended phase.

The primary portion consists of the pre-mixture that is added to about 100 gallons of heated water at a temperature from about 130–160° F. (54.4–71.1° C.), preferably about 140–145° F. (60–62.8° C.), and agitated until dispersed at about 10–14 parts per 100 parts of the primary portion (85–120 lbs. of the premixture), preferably 11–13 parts per 100 parts, is added. Sufficient 50% w/w caustic is added at between about 25–35 parts, preferably about 29–33 parts, per 100 parts of primary portion to raise the pH to between about 10–14, preferably about 12–14. This mixture is agitated for a given length of time from about 10 to 40 minutes, preferably from about 15 to 35 minutes.

Secondary water, about 500 gallons, is heated to from about 75–105° F. (23.9–40.6° C.), preferably about 90–95° F. (32.2–35° C.) and the pre-mixture is added at between about 19–27 parts per 100 parts of secondary water (1000–1500 lbs. pre-mixture), and preferably about 21–24 parts per 100 parts, and agitated while the primary portion is dropped into the secondary portion at a rate of about 4–11, preferably about 7–9 gallons/minute. Once the primary portion is incorporated into the secondary portion, it is given a certain amount of time, dependent on the desired viscosity, to partially swell some of the raw pre-mixture granules. When a desired viscosity is reached, a boron containing compound (5M boric acid or 10M borax) is added in an amount from about 50–85 parts, preferably about 55–70 parts boron containing compound per 100 parts of dry caustic to stop the reaction.

The following is a brief description of individual components of the pre-mixture and adhesive compositions of the invention.

Starch Component

When a starch component is used according to the invention, unmodified starch is preferred. Unmodified starch is a commodity chemical produced from the root, stem or fruit from a number of plants. It is a high molecular weight carbohydrate polymer which is comprised of linear and branched polysaccharide polymers and it can have a moisture content from about 8% to about 15%, most commonly from about 11% to about 13%. Preferred starches are those made from corn and wheat, but other starches such as those derived from barley, tapioca, potato and the like are suitable. Blends of starches from various sources also can be used. Modified starch and/or dextrin can be used as the starch component, but unmodified starch is more economical.

Plant Germ

The preferred plant germ is corn germ derived from the corn wet milling process. This germ is called extracted spent flake or spent germ flake which refers to the resulting solids from the oil extraction step in the corn wet milling process. A source of suitable spent flake is from corn wet milling hexane extraction and one of the benefits of hexane extraction for purposes of the present invention is that it removes oil. Alkali extracted spent flake is preferred, however, because it makes a more soluble material. Spent flake contains up to about 30% starch and the spent flake used according to the invention has from about 10% to about 30% starch, preferably from about 20% to about 30% starch. A typical spent flake product was found on analysis to contain 8.8% moisture, 22.8% hemicellulose, 11.4 percent cellulose (the ratio of hemicellulose to cellulose being 2:1), 22% starch, 22.9% protein, 3.4% fat, 3.5% ash and 11.5% solubles.

Boron Containing Compound

If a boron containing compound is used, any compound having free hydroxyl groups attached to the boron atoms would be suitable. The most commonly used compounds are commercial boric acid (ortho boric acid, $H_3BO_3$ and its hydrated forms $H_3BO_3.xH_2O$) and borax (sodium tetraborate decahydrate, $Na_2B_4O_7.10H_2O$ and other hydrate and anhydrous forms).

Caustic

Any strong base can be used, but the preferred bases are alkali metal hydroxides. The most preferred are sodium and potassium hydroxide.

Waterproofing/Water Resistance

If enhanced waterproofing or water resistance is desired, conventional resins which are employed in the corrugating industry can be used.

EXAMPLE I

A Stein Hall paste was made using a blend of spent flake and pearl starch in the primary and secondary mixers. The amount of flake substituted for pearl starch was 10% based on total starch in the paste.

Primary Mixer

Add

| | |
|---|---|
| • Water | 10 liters @ 140° F. |
| • Pre-mix of 10% ground spent flake and 90% 3005 pearl starch | 4 lbs. |

Mix for 5 minutes

Add

| | |
|---|---|
| • Caustic | 544 grams |
| • Water | 2 liters |

Mix for 15 minutes

Add

| | |
|---|---|
| • cooling water<br>Drop Time - 30 minutes | 5.5 liters |

Secondary Mixer
Add

| | |
|---|---|
| • Water | 30 liters @ 104° F. |
| • Pre-mix of 10% ground spent flake and 90% 3005 pearl starch | 38.5 lbs. |
| • Borax | 100 grams |

Mix for 5 minutes
Add

| | |
|---|---|
| • Water | 8 liters |

The carrier phase from the primary mixer is gradually added to the suspended starch phase in the secondary mixer with continuous mixing

| | |
|---|---|
| Finish viscosity | 3 minutes Stein-Hall |
| Finish gel temperature | 152° F. |

TABLE I

Test Results
Single-Facer Trial

| | Edge Crush[1] (#/In) | | Flat Crush[1] (PSI) | | Single-Face Dry Pin Adhesion[1] #/24 Ln In | |
|---|---|---|---|---|---|---|
| Sample Identification | Avg. | S.D. | Avg. | S.D. | Avg. | Std. Dev. |
| 912-S7-KRH-12 -300 | 21.1 | 1.4 | 30.6 | 0.9 | 110.7 | 3.3 |
| -500 | 19.3 | 1.8 | 34.6 | 0.7 | 109.1 | 3.5 |
| -700 | 20.7 | 1.3 | 32.7 | 0.6 | 89.5 | 4.5 |
| 912-S7-HPL-12 -300 | 26.1 | 1.5 | 35.3 | 0.5 | 107.3 | 5.3 |
| -500 | 25.2 | 1.3 | 38.5 | 0.9 | 71.2 | 6.0 |
| -700 | 23.3 | 1.4 | 36.3 | 0.8 | 22.8 | 2.5 |

[1]TAPPI Test Methods 1989, available from TAPPI, One Dunwoody Park, Atlanta, GA 30351, U.S.A. (Edge Crush - TAPPI 811, Flat Crush - TAPPI 824 and Dry Pin Adhesion - TAPPI 821)

EXAMPLE II

Two paste formulations were prepared and used in corrugating trials to evaluate finished paste and greenbond. Edge Crush, Flat Crush and Dry Pin Adhesion results are set forth in Table II.

Paste WB Formula (with borax)
Primary Portion

| | |
|---|---|
| Water, Liters | 10.32 |
| Heat to | 145° F. |
| Add pre-mixture, lb | 3.04 |
| Mix, minutes | 5 |
| Add caustic (50%), g | 447.2 |
| Mix, minutes | 20 |

Secondary Portion

| | |
|---|---|
| Add water @ 90° F., Liters | 24.1 |
| Add Borax (10 mol), g | 12 |
| Add pre-mixture, lb. | 21.64 |

| | |
|---|---|
| Drop Time, min. | 20 |
| Final Mix Time, min. | 10 |

IPST Adhesive Results

| | |
|---|---|
| Final Temperature, °F. | 91 |
| Viscosity, sec. (S-H) | 41 |
| Gel Temperature, °F. | 154 |

Greenbond Results (unofficial)

WB-Kraft High Temperature (KRH)—12 mil glue roll gap setting =575 Feet per minute (FPM)

WB-KRH-20 mil glue roll gap setting =500 FPM

Paste WO Formula (without borax)
Primary Portion

| | |
|---|---|
| Water, Liters | 10.32 |
| Heat to | 145° F. |
| Add Preblend, lb | 3.04 |
| Mix, minutes | 5 |
| Add caustic (50%), g | 447.2 |
| Mix, minutes | 20 |

Secondary Portion

| | |
|---|---|
| Add water @ 90° F., Liters | 24.1 |
| Add Preblend, lb. | 21.64 |
| Drop Time, min. | 20 |
| Final Mix Time, min. | 10 |

IPST Adhesive Results

| | |
|---|---|
| Final Temperature, °F. | 96 |
| Viscosity, sec. (S-H) | 33 |
| Gel Temperature, °F. | 150 |

Greenbond Results (unofficial)

WO-KRH-12=500 FPM

WO-KRH-20=550 FPM

WO-High Performance Low Temperature (HPL)-12=550 FPM

TABLE II

Test Results
Single-Facer Trial

| Sample Identification | Edge Crush (#/In) Avg. | S.D. | Flat Crush (PSI) Avg. | S.D. | Single-Face Dry Pin Adhesion (#/24 Ln In) Average | Std. Dev. | Fiber Pull (%) |
|---|---|---|---|---|---|---|---|
| 62A-WB-KRH-12-300 | 21.4 | 1.4 | 28.3 | 0.9 | 99.7 | 5.1 | 0** |
| -500 | 20.1 | 1.8 | 29.1 | 0.5 | 89.8 | 4.2 | 0 |
| -700 | 19.6 | 1.4 | 29.8 | 1.0 | 66.3 | 4.7 | 0 |
| 624-WB-KRH-20-300 | 21.8 | 2.0 | 26.5 | 1.0 | 116.8 | 6.4 | 0* |
| -500 | 19.3 | 1.6 | 28.3 | 0.4 | 78.0 | 7.4 | 0 |
| -700 | 18.9 | 1.2 | 28.2 | 0.4 | 54.4 | 6.9 | 0 |
| 624-WO-KRH-12-300 | 22.8 | 1.2 | 28.7 | 0.4 | 84.3 | 3.0 | 0 |
| -500 | 22.7 | 1.4 | 28.3 | 0.7 | 88.3 | 2.6 | 0 |
| -700 | 23.6 | 2.1 | 29.0 | 0.6 | 68.0 | 9.6 | 0 |
| 624-WO-KRH-20-300 | 23.3 | 1.8 | 28.3 | 1.3 | 101.1 | 2.7 | 0 |
| -500 | 22.4 | 1.2 | 28.1 | 0.4 | 87.8 | 3.8 | 0 |
| -700 | 21.7 | 2.2 | 28.3 | 0.6 | 59.5 | 8.4 | 0 |
| 624-WO-HPL-12-300 | 22.3 | 1.2 | 31.7 | 0.8 | 81.0 | 5.6 | 0 |
| -500 | 22.1 | 1.5 | 33.1 | 1.6 | 78.3 | 6.6 | 0 |
| -700 | 21.2 | 1.4 | 33.2 | 1.6 | 54.1 | 8.7 | 0 |

Note:
*is slight,
**is moderate

What is claimed is:

1. A dry blend pre-mixture composition for use as a starch replacement in making a starch based corrugating adhesive, the composition comprising starch and from about 5% to about 20% ground plant germ.

2. The composition of claim 1 wherein the plant germ is spent flake from the corn wet milling process.

3. A process for making a carrier corrugating adhesive composition comprising
   admixing starch with from about 5% to about 20% of ground plant germ to make a pre-mixture,
   adding water to a primary mixer and heating the water to a temperature from about 130° F. to about 160° F.; admixing starch and/or the pre-mixture with the water in an amount from about 9 to about 13 parts pre-mixture per 100 parts of water and maintaining the temperature while continuing mixing for from to about 10 to about 40 minutes followed by admixing caustic and water while continuing mixing and maintaining heating;
   adding water to a secondary mixer and heating the water to a temperature from about 70° F. to about 105° F.; admixing the pre-mixture with the water in an amount from about 22–28 parts pre-mixture per 100 parts of water and continuing mixing; and
   admixing the contents of the primary mixer and the secondary mixer.

4. The product of the process of claim 3.

5. A process for making a no-carrier adhesive composition comprising
   admixing starch with from about 5% to about 20% ground plant germ to make a pre-mixture;
   adding water to a mixing tank and heating to a temperature from about 90° F. to about 100° F.; admixing the pre-mixture with the water in an amount from about 19 to about 28 parts pre-mixture to 100 parts water and continuing mixing; and
   admixing a hot caustic solution to attain a pH from about 10–14 and continuing mixing to allow partial swelling until a viscosity of from about 30 to about 50 seconds is attained and then admixing boric acid to stop the swelling.

6. The product of the process of claim 5.

7. A process for making a carrier-no-carrier adhesive composition comprising
   admixing starch with from about 5% to about 20% ground plant germ to make a pre-mixture;
   adding water to a primary mixer and heating the water to a temperature from about 130° F. to about 160° F.; admixing starch and/or the pre-mixture with the water in an amount from about 10 parts to about 14 parts per 100 parts of the primary portion; admixing caustic to raise the pH to from about 10 to about 14 and continuing mixing for from about 10 to about 40 minutes while maintaining heating;
   adding water to a secondary mixer and heating the water to a temperature from about 75° F. to about 105° F.; admixing the pre-mixture with the water in an amount from about 19 to about 27 parts per 100 parts water and continuing mixing while the contents of the primary mixer are admixed with the contents of the secondary mixer;
   after the contents of the primary mixer are added to the secondary mixer, mixing is continued to allow partial swelling until a viscosity from about 30 to about 50 seconds is attained and then a boron containing compound is admixed therein to stop the swelling.

8. The product of the process of claim 7.

9. A carrier, no-carrier or carrier-no-carrier corrugating adhesive composition wherein the improvement comprises incorporating in the adhesive composition as a complete or partial substitute for starch a pre-mixture composition comprising starch and from about 5% to about 20% ground plant germ.

10. A method of making corrugated board comprising joining a corrugated medium to at least one liner using the corrugating adhesive of claim 9.

11. The corrugated board made by claim 10.

* * * * *